UNITED STATES PATENT OFFICE.

MASATARO JINBO AND KINGIRO HOSHIZAKI, OF KANSAS CITY, MISSOURI.

PROCESS OF MAKING TABLE SAUCES.

1,025,402.      Specification of Letters Patent.      Patented May 7, 1912.

No Drawing.      Application filed June 17, 1911. Serial No. 633,897.

*To all whom it may concern:*

Be it known that we, MASATARO JINBO and KINGIRO HOSHIZAKI, subjects of the Emperor of Japan, residing at Kansas City, in the county of Jackson and State of Missouri, have invented certain new and useful Improvements in Processes of Making Table Sauces, of which the following is a specification.

This invention relates to a method of making table sauces and has for its object to produce a sauce for use with soups, meats, fish and other foods.

To this end the invention consists in the peculiar and novel method of combining a table sauce, as hereinafter described and claimed.

In producing the sauce the following ingredients in substantially the proportions specified are used and compounded together. One hundred pounds of wheat roasted to a very light brown color and ground to about one-fourth or one-fifth the size of the grain. Then boil one hundred pounds of white beans about twelve hours and permit the same to cool, or the cooling may be effected rapidly in any other suitable manner, and when the beans are perfectly cold mix them with the ground wheat and place the mixture in a shallow vessel or vessels, preferably of wood, in a room, the walls of which are preferably of cement, said room having suitable means for ventilation. The room should be maintained at a temperature of about ninety five to one hundred degrees Fahrenheit, preferably with a charcoal fire, for about twenty hours, and then the temperature of said room is reduced to about eighty five or ninety degrees Fahrenheit, the reduction being gradual, and extending over a period of about one day. The mixture is left in such vessel or vessels in said room for about one hundred and forty four hours and stirred three or four times during each twelve hours of such time. Then mix together about twenty six gallons of water and fifty pounds of salt, preferably American table salt, and boil for about one and one half hours and when the solution thus produced gets cold, introduce the mixture of wheat and beans and stir about twice a day and once each night for a period of about twelve months. The mixture is then strained through a cotton cloth bag, the coarse particles retained by the bag being waste or residuum. The bag or bags employed should of course be boiled before use for sanitary purposes. What may be termed a second brew is then produced the same consisting of three teaspoonfuls dry mustard seed; four teaspoonfuls dried cloves, eight teaspoonfuls dried thyme, two-thirds of an ounce of dried cinnamon, one-fourth of an ounce dried bay leaf, two teaspoonfuls crushed dried pepper, and four stalks of leek, which latter is the only green material employed in the sauce. This mixture in the proportions named, is introduced into one gallon of the first brew and then the mixture is boiled for about eight hours and when cold is placed in a barrel or its equivalent, and left therein until it ferments, which takes from one to two months according to the weather, and when it attains the fermenting point it is strained preferably through a cotton cloth bag, and mixed with ten tablespoonfuls of vinegar and then boiled for about three hours. The sauce is then ready to be bottled for the market.

The first brew constitutes the main ingredient of the sauce but such compound after standing for a comparatively short period of time gets slightly offensive as to odor and upon it forms a whitish substance or mold. The mixture of the first or main brew with the second brew or condiments and the subsequent introduction of the vinegar has a preserving or pickling effect so that the sauce will keep indefinitely, and prevents the same giving forth any offensive odor, and the accumulation of a whitish substance as above suggested.

We claim:

1. The process of making a table sauce, the same consisting in browning wheat, mixing boiled beans with the wheat and storing the mixture in a ventilated room at a temperature of about ninety five degrees Fahrenheit and for a sufficient length of time to guard against fermentation and then gradually reducing the temperature of the room for about a day to about eighty-five or ninety degrees Fahrenheit and letting it stand at such temperature for sufficient time for fermentation, stirring it at intervals during such time, then adding to it a saline solution produced by the mixture of boiled water and salt and letting this mixture or compound stand for a period of more than six months and stirring the same at suitable intervals day and night during such period, then mixing with this compound a second brew consisting of dried mustard seed, cloves, thyme, cinnamon, bay leaf and pepper and boiling and straining the same and permitting it to stand a sufficient length of time to ferment and then straining this mixture and adding vinegar sufficient for pickling purposes and boiling the product for sufficient time to guard against fermentation.

2. The process of making a table sauce, the same consisting in browning wheat, boiling beans in water and mixing the same together and storing same in a ventilated room at a temperature ninety five to one hundred degrees Fahrenheit for about twenty hours and then gradually reducing the temperature of the room for about a day until it is about eighty five or ninety degrees Fahrenheit, and letting it stand at such temperature for about one hundred and forty four hours, and stirring at intervals, and then adding to it a saline solution produced by a mixture of boiled water and salt and letting the compound stand for about twelve months and stirring the same at suitable intervals during the day and night during that period; then mixing into this compound a second brew consisting of dried mustard seed, cloves, thyme, cinnamon, bay leaf, pepper and stalks of leek, and boiling and straining the same and permitting it to stand a sufficient length of time to ferment and then straining the same and adding vinegar and boiling the resultant mixture for about three hours.

In testimony whereof we affix our signatures, in the presence of two witnesses.

MASATARO JINBO.
KINGIRO HOSHIZAKI.

Witnesses:
HELEN C. RODGERS,
G. Y. THORPE.